United States Patent
Ahn et al.

(10) Patent No.: US 7,949,193 B2
(45) Date of Patent: May 24, 2011

(54) APPARATUS AND METHOD FOR COMPRESSING THREE-DIMENSIONAL STEREOSCOPIC IMAGES

(75) Inventors: Sang-Jun Ahn, Seoul (KR); Young-Seop Han, Suwon-si (KR); Kwang-Cheol Choi, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 998 days.

(21) Appl. No.: 11/771,108

(22) Filed: Jun. 29, 2007

(65) Prior Publication Data

US 2008/0130984 A1 Jun. 5, 2008

(30) Foreign Application Priority Data

Dec. 1, 2006 (KR) .................. 10-2006-0120607

(51) Int. Cl.
*G06K 9/46* (2006.01)
*G06K 9/00* (2006.01)
(52) U.S. Cl. .................. 382/232; 382/154; 382/236
(58) Field of Classification Search .................. 382/154, 382/232, 235–236, 238–239, 243–244; 375/240; 345/419–420
See application file for complete search history.

(56) References Cited

U.S. PATENT DOCUMENTS

| 6,037,991 | A  | * | 3/2000 | Thro et al. | 725/116 |
| 6,111,979 | A  | * | 8/2000 | Katto | 382/154 |
| 2005/0226501 | A1 | * | 10/2005 | An | 382/166 |

OTHER PUBLICATIONS

Frajka, et al (Residual image coding for stereo image compression), pp. 182-189, 2003.*

* cited by examiner

*Primary Examiner* — Daniel G Mariam
(74) *Attorney, Agent, or Firm* — Jefferson IP Law, LLP (57) ABSTRACT

An apparatus and method for efficiently compressing three-dimensional stereoscopic images are provided. The apparatus and method include a search for Global motion between left and right images input through two image input units mounted in a mobile communication terminal. The images are arranged and a difference between the two images is computed. The images are compressed using the difference between the two images and a reference image. Accordingly, because the left and right images are similar, a computation amount can be reduced since the global motion is computed only once.

20 Claims, 6 Drawing Sheets

APPARATUS AND METHOD FOR COMPRESSING THREE-DIMENSIONAL STEREOSCOPIC IMAGES

PRIORITY

This application claims the benefit under 35 U.S.C. §119(a) of a Korean Patent Application filed in the Korean Intellectual Property Office on Dec. 1, 2006 and assigned Ser. No. 2006-120607, the entire disclosure of which is hereby incorporated by reference.

BACKGROUND OF THE INVENTION

1. Field of the Invention

The present invention generally relates to an apparatus and method for processing stereoscopic images. More particularly, the present invention relates to an apparatus and method for efficiently compressing three-dimensional stereoscopic images.

2. Description of the Related Art

Terminals capable of reproducing multimedia images in digital multimedia broadcasting (DMB) and the like are being widely used. As part of the reproducing of multimedia images, complex images must be processed by various methods since the images have a vast amount of data mixed with graphics or text and natural images when they are transmitted. The vast amount of data associated with these images presents many problems in terms of transmission traffic and storage. To address these problems, image compression is necessary. Also, the need for additional image compression is increasing with the advent of new image application fields.

A mobile communication terminal capable of transmitting and receiving images may process images using the following method.

The mobile communication terminal converts optical image signals of an object, input through a camera, into electrical signals, digitally processes the electrical signals, and outputs the processed signals to a screen. To transmit an image, the image captured by the camera is encoded and packetized to reduce the amount of transmission load. The encoded and packetized image is transmitted to another terminal. However, since existing compression schemes such as Moving Picture Experts Group Compression Standard Version 4 (MPEG4), Joint Photographic Experts Group (JPEG) and the like are currently being used without considering a stereoscopic image characteristic, compression efficiency is very low.

In addition, when stereoscopic images are transmitted or displayed, a portable device, such as a mobile communication terminal, is limited in the number of operations it may process since the stereoscopic images have a larger amount of image information than still images and thus require more of the device's processing capacity.

SUMMARY OF THE INVENTION

As described above, stereoscopic image technologies have a problem in that existing compression techniques are used without considering a stereoscopic image characteristic when three-dimensional (3D) stereoscopic images are compressed.

Accordingly, the present invention has been made to address at least the above problems and/or disadvantages and to provide at least the advantages described below, and an object of the present invention is to provide an apparatus and method for efficiently compressing 3D stereoscopic images.

Another object of the present invention is to provide an apparatus and method for compressing 3D stereoscopic images that can minimize a computation amount when images captured through two image input units are compressed.

In accordance with an aspect of the present invention, an apparatus for compressing 3D stereoscopic images is provided. The apparatus includes image input units for outputting images corresponding to images of an object, a difference estimator for searching for an overlapped image having the smallest disparity by comparing a first image with a search area in which a boundary part of a second image is extended and acquiring a residual image between the first image and the overlapped image whose position is arranged after computing and storing a position difference between the overlapped image and the second image and an encoder for encoding the residual image and the position difference output from the difference estimator and the first image output from one of the image input units.

In accordance with another aspect of the present invention, a method for compressing 3D stereoscopic images in a mobile communication terminal is provided. The method includes receiving input images corresponding to images of an object from image input units, searching for an overlapped image having the smallest disparity by comparing a first image with a search area in which a boundary part of a second image is extended, acquiring a residual image between the first image and the overlapped image whose position is arranged after computing and storing a position difference between the overlapped image and the second image and encoding the residual image, the position difference and the first image.

BRIEF DESCRIPTION OF THE DRAWINGS

The above and other features and advantages of the present invention will be more apparent from the following detailed description taken in conjunction with the accompanying drawings, in which:

FIGS. 6(a) & (b) respectively illustrate a left image arranged using a global motion value and a right original image in accordance with an exemplary embodiment of the present invention;

FIGS. 8(a) & (b) illustrate target images to be compressed in accordance with an exemplary embodiment of the present invention.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for efficiently compressing three-dimensional (3D) stereoscopic images. In exemplary embodiments of the present invention, a search is made for global motion between two images input through image input units. In an exemplary embodiment, the two images may include left and right images which are respectively input through two image input units. In another exemplary embodiment, the image input units are mounted in a mobile communication terminal. After input and arrangement of the images, a difference between the two images is computed. The images are compressed using the difference between the two images and a reference image. Accordingly, an overall amount of computation can be reduced since global motion of an entire image is computed only once using a characteristic of the two images.

Figure 1:
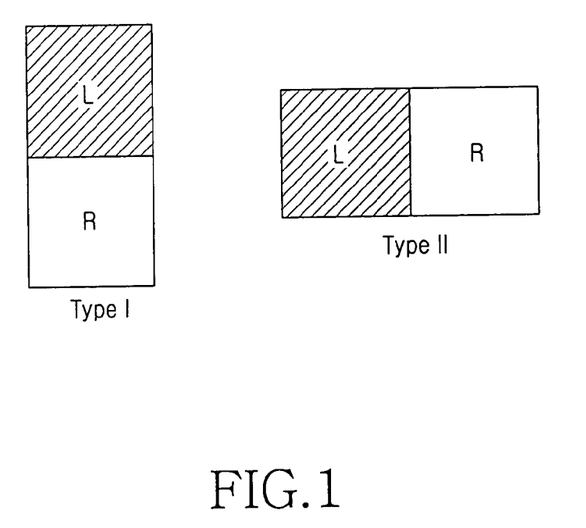
FIG. 1 illustrates a structure of stereoscopic images input through two image input units in accordance with an exemplary embodiment of the present invention.

Stereoscopic images used in exemplary embodiments of the present invention have a structure as illustrated in FIG. 1. The structure of FIG. 1 is different from a structure of existing images. FIG. 1 illustrates a structure of stereoscopic images input through two image input units in accordance with an exemplary embodiment of the present invention.

In an exemplary embodiment, two image input units are implemented with camera sensors mounted in a mobile communication terminal. In another exemplary embodiment, the image input units are spaced from each other by a distance. As illustrated in FIG. 1, a left image and a right image, respectively input through the image input units, are acquired by photographing an object. The left and right images make up a stereo pair. After the object is photographed, for example by using the two camera sensors spaced from each other by a distance, the two images of the stereo pair, that is, the left and right images, can be attached and stored. At this time, the left and right images can be stored as Type I or II as illustrated in FIG. 1.

When the object is photographed by the above-described camera sensors having different positions, a detailed motion difference between the left and right images of a stereo pair is absent. However, in an exemplary embodiment of the present invention, a motion difference can be computed using only global motion of an entire image. Thus, at the time of encoding, motion information can be computed by only one calculation without computing a difference between the left and right images in which the entire image is divided on a block-by-block basis. Therefore, the present invention can significantly reduce a computation amount. In addition, since the motion information amount itself is small, a difference value between the two images can be also transmitted. Since one motion information element is used at the time of decoding, a decoding process can be simplified and advantageously applied to an actual system.

Since a difference between the positions of the two image input units is very small, a position difference between the left and right images captured through the two image input units is very small, as well as the left and right images have high similarity. Thus, the present invention proposes a method for improving compression efficiency of 3D stereoscopic images using the high similarity between the left and right images.

Next, an apparatus for compressing 3D stereoscopic images in accordance with an exemplary embodiment of the present invention will be described with reference to the block diagram of FIG. 2.

Figure 2:
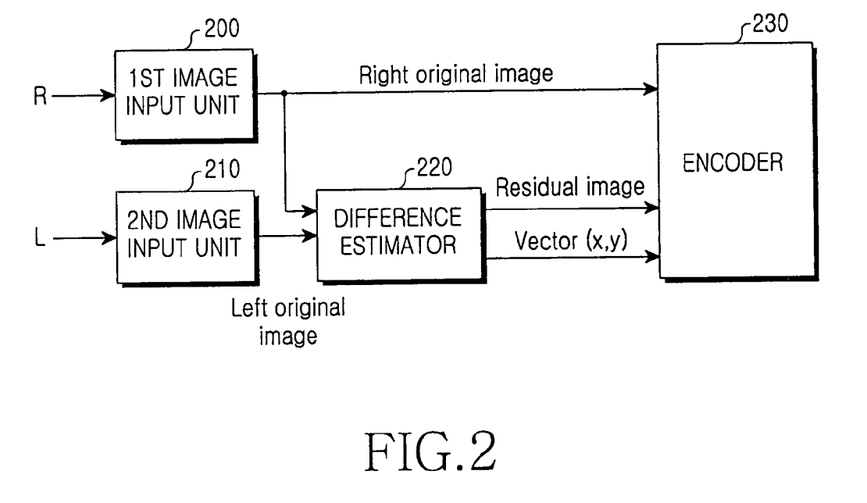
FIG. 2 is a block diagram illustrating an apparatus for compressing three-dimensional (3D) stereoscopic images in accordance with an exemplary embodiment of the present invention.

Referring to FIG. 2, a first image input unit 200 and a second image input unit 210, corresponding to camera sensors, generate right and left images by photographing one object. The first and second image input units digitally convert and output the right and left images, respectively. Although the object is photographed through the image input units 200 and 210 spaced from each other by a distance, the object is displayed on a screen in a state in which position differences in the right and left images occur in proportion to distances between the image input units 200 and 210 and the object.

The mobile communication terminal stores the right and left images input through the two image input units 200 and 210 in any one of the types as illustrated in FIG. 1. When transmission of the images is desired, the mobile communication terminal performs an encoding process for compressing the stored right and left images.

The encoding process will now be described in greater detail. First, an image captured through the first image input unit 200, for example, a right original image, is output to an encoder 230 without modification. The right original image is also output to a difference estimator 220. An image captured through the second image input unit 210, for example, a left original image, is also output to the difference estimator 220.

The difference estimator 220 receives the left and right original images in a frame unit and computes a difference between the input left and right original images. Hereinafter, for convenience of explanation, an example will be described in which a position difference of the left original image is computed with respect to the right original image as a reference.

The difference estimator 220 computes global motion between the right and left original images. In order to perform this computation, after a boundary of the left original image is extended by x pixels, the extended area is filled with pixel values corresponding to a boundary value part. The extended left original image is used as a search area. The search area is used to determine a best match with the right original image. In an exemplary embodiment, the best match is determined by overlapping the search area with the right original image, moving the search area relative to the right original image and determining which position of the search area has the smallest disparity with the right original image. When the best match is determined from the search process, the difference estimator 220 computes and stores a position difference between the overlapped image corresponding to the best match and the left original image. The position difference is a vector value indicating how much the overlapped image corresponding to the best match has been moved in a direction with respect to the reference of the right original image and can be set as global motion information indicating the degree of motion. The overlapped image is arranged for a comparison with the right original image using the global motion information. Then, the difference estimator 220 computes a difference between the arranged overlapped image and the right original image.

When determining a residual image indicating the difference between the two images, the difference estimator 220 outputs the residual image and the vector value corresponding to the pre-stored position difference to the encoder 230. Then, the encoder 230 encodes the right original image output from the first image input unit 200 and the residual image and the vector value output from the difference estimator 220, and then outputs an encoding result. The reason why the vector value indicating the position difference is compressed along with the images is that the compressed images can be recovered only when a receiving side knows how much the left image has been moved. The encoder 230 compresses only the residual image and the one original image, thereby significantly improving compression efficiency. When the encoded data is transmitted after packet data is generated from the encoded data and is converted into a standard format, transmission load can be significantly reduced since the amount of data is small.

Next, a process for compressing 3D stereoscopic images in accordance with an exemplary embodiment of the present invention will be described with reference to FIG. 3.

Figure 3:
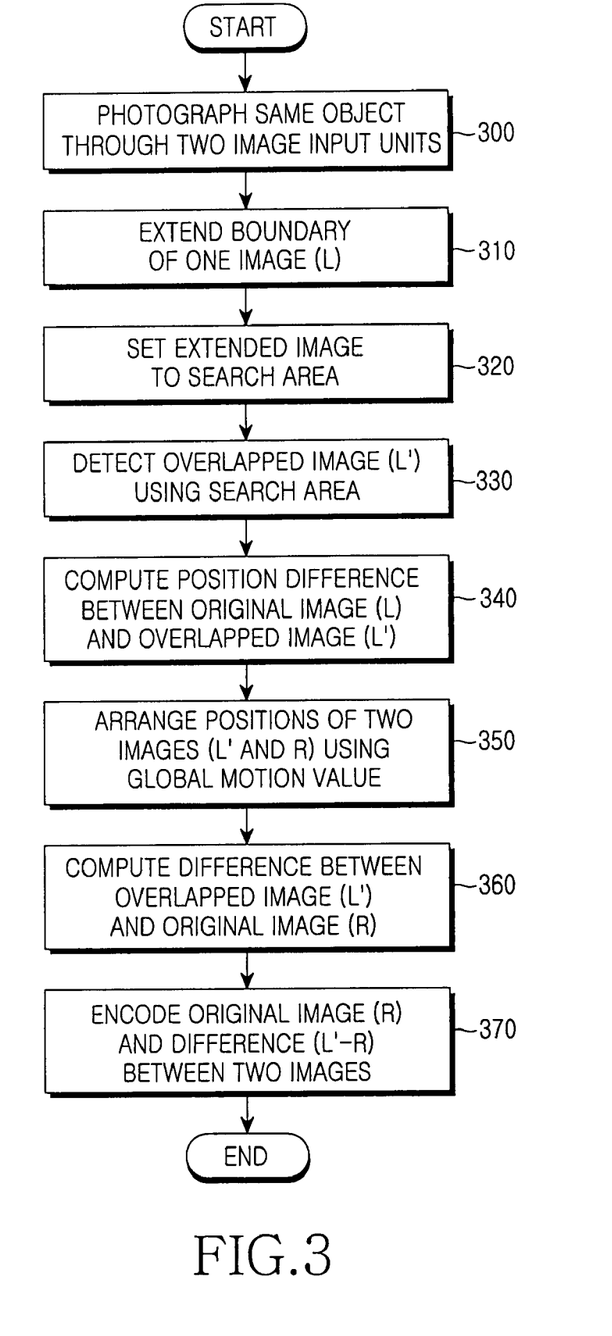
FIG. 3 is a flowchart illustrating a process for compressing 3D stereoscopic images in accordance with an exemplary embodiment of the present invention.

Referring to FIG. 3, the same object is photographed through the two image input units 200 and 210 in step 300. Two images, that is, right and left original images, can be acquired. For example, the first image input unit 200 outputs the right original image to the difference estimator 220 and the encoder 230 and the second image input unit 210 outputs the left original image to the difference estimator 220.

Figure 4:
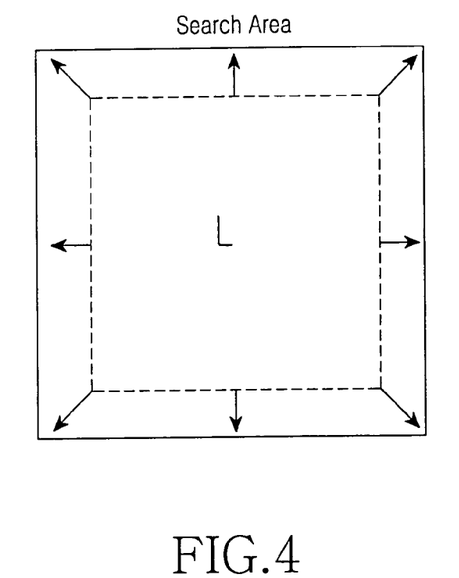
FIG. 4 illustrates an image in which a boundary of a left original image is extended in accordance with an exemplary embodiment of the present invention.

The difference estimator 220 extends a boundary of one of the two images input in step 310. Hereinafter, an example in which the left original image is extended as illustrated in FIG. 4 will be described. FIG. 4 illustrates an image in which the boundary of the left original image is extended in accordance with an exemplary embodiment of the present invention. First, the boundary of the left original image is extended by x pixels as illustrated in FIG. 4. In an exemplary embodiment, the left original image is extended through padding. In other words, an area from the boundary of the left original image as indicated by a dotted line to the extended boundary as indicated by a solid line is filled with pixel values whose number corresponds to that of extended pixels. The pixel values correspond to those of a boundary part as indicated by the dotted line. In an exemplary embodiment, the pixel values are equal to those of the boundary part. Then, the difference estimator 220 sets the extended image as a search area in step 320.

Figure 5:
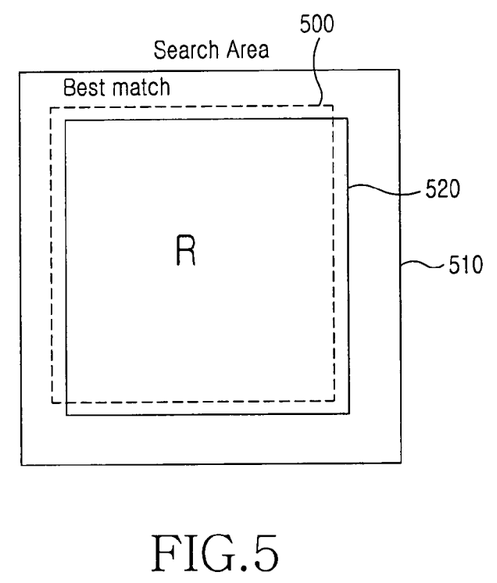
FIG. 5 illustrates a method for processing an overlapped image in accordance with an exemplary embodiment of the present invention.

The difference estimator 220 detects an overlapped image L' using the search area in step 330. The overlapped image L' is detected in a method as illustrated in FIG. 5. FIG. 5 illustrates a method for processing the overlapped image in accordance with an exemplary embodiment of the present invention. The difference estimator 220 computes a disparity between a search area 510 and a right original image 520 while moving the right original image 520 over the search area 510 as illustrated in FIG. 5. Through the computation, an overlapped image (L') 500 corresponding to a best match with the smallest disparity can be determined. Then, the difference estimator 220 computes a position difference between an original image, that is, a left original image L, and the overlapped image L', in step 340. For example, the position difference indicates how much the overlapped image L' has been moved on the basis of position movement of the overlapped image L' from the center point of the left original image L by comparing the center point of the left original image L and the center point of the overlapped image L'. The position difference between the left original image L and the overlapped image L' can be expressed by a vector value. This vector value is stored such that the receiving side can use the vector value to recover the images.

Figure 6:
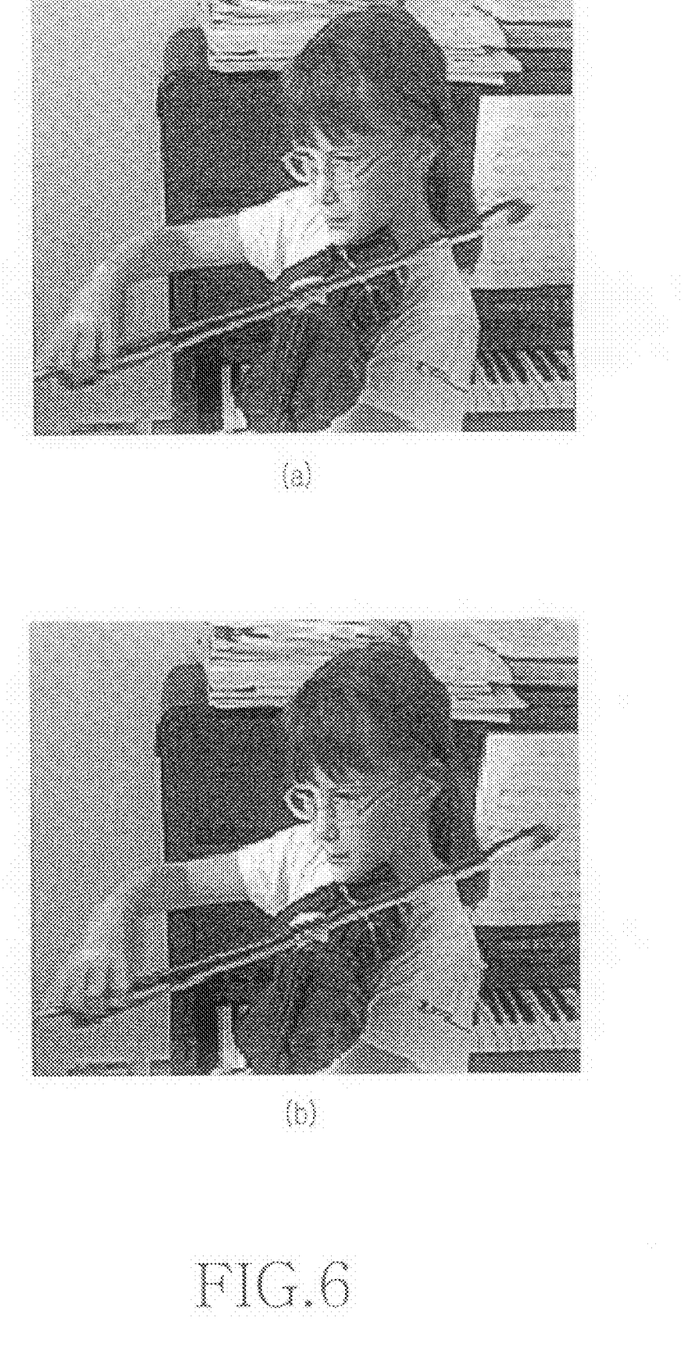

Since the vector value indicates the degree of motion, the vector value can be defined as a global motion value indicating the degree of motion of one frame. The difference estimator 220 performs the position arrangement to compare the overlapped image L' with the right original image using the global motion value in step 350. Thus, the overlapped image L' and the right original image are arranged as illustrated in FIG. 6. FIG. 6(a) illustrates an example of the left image L' arranged using the global motion value, and FIG. 6(b) illustrates an example of the right original image. Since a global position difference is computed between the search area and one original image in a 1:1 scheme using the search area without dividing an image on a block-by-block basis, the global motion value is computed only once. If block-by-block motion information is searched for with respect to one image, a computation amount increases and motion information to be additionally provided increases in proportion to the number of blocks. However, since a detailed motion difference between the left and right images of a stereo pair is absent and only positions of cameras are different from each other, the difference between the two images is not large.

Figure 7:
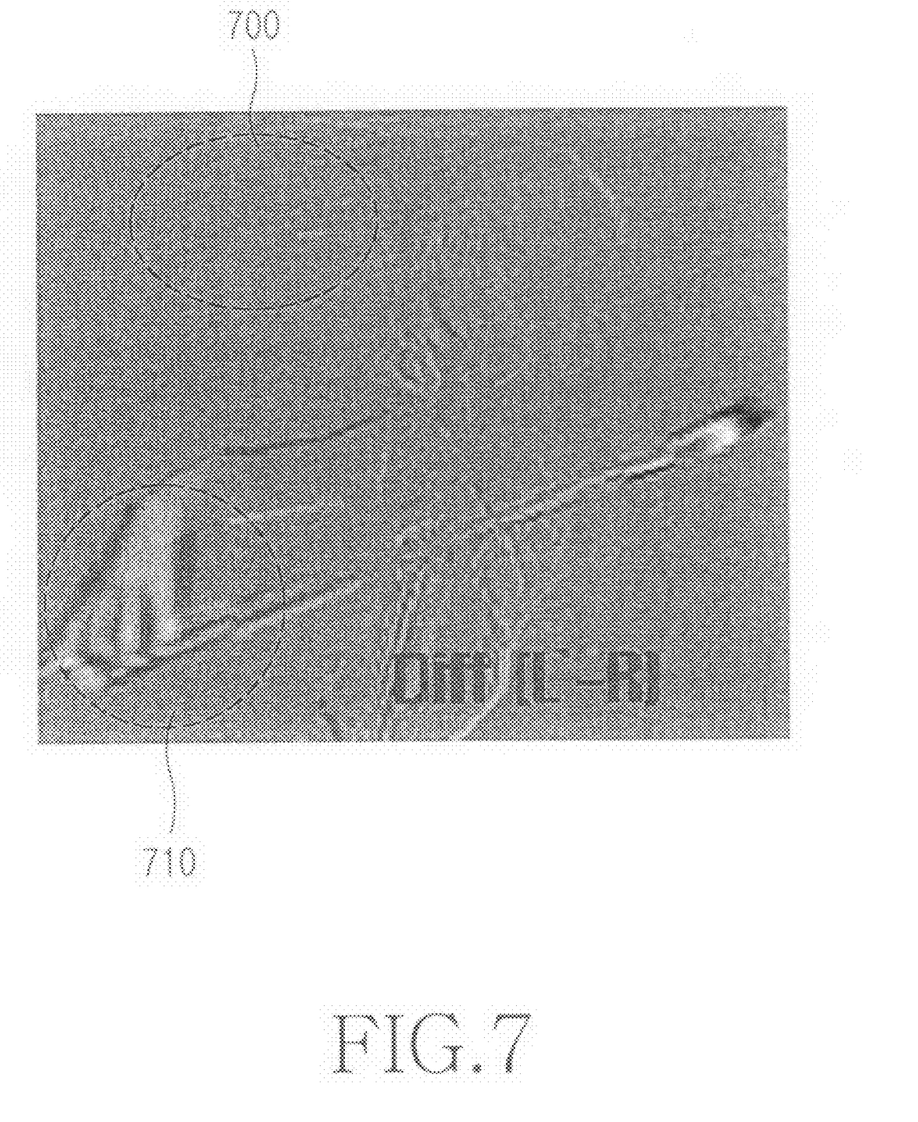
FIG. 7 illustrates a difference image in accordance with an exemplary embodiment of the present invention.

When the position arrangement is performed for a comparison between the overlapped image L' and the right original image R as illustrated in FIG. 6, the difference estimator 220 computes a difference between the overlapped image L' and the right original image R, as illustrated in FIG. 7, in step 360. That is, a difference image obtained by subtracting the right original image R from the arranged overlapped image L' is viewed as illustrated in FIG. 7. The difference image is computed to improve compression efficiency, reduce an amount of transmission load, and send only a residual difference part excluding an overlapped part in exemplary embodiments of the present invention. Thus, the encoder 230 compresses and sends only the residual difference image excluding the part overlapping with one original image.

FIG. 7 illustrates the difference image, that is, the residual image, in accordance with an exemplary embodiment of the present invention. It is shown that a difference in a part 700 is almost absent and a difference in a part 710 is very large. As a difference in a part of the residual image increases, a brightness increases.

Figure 8:
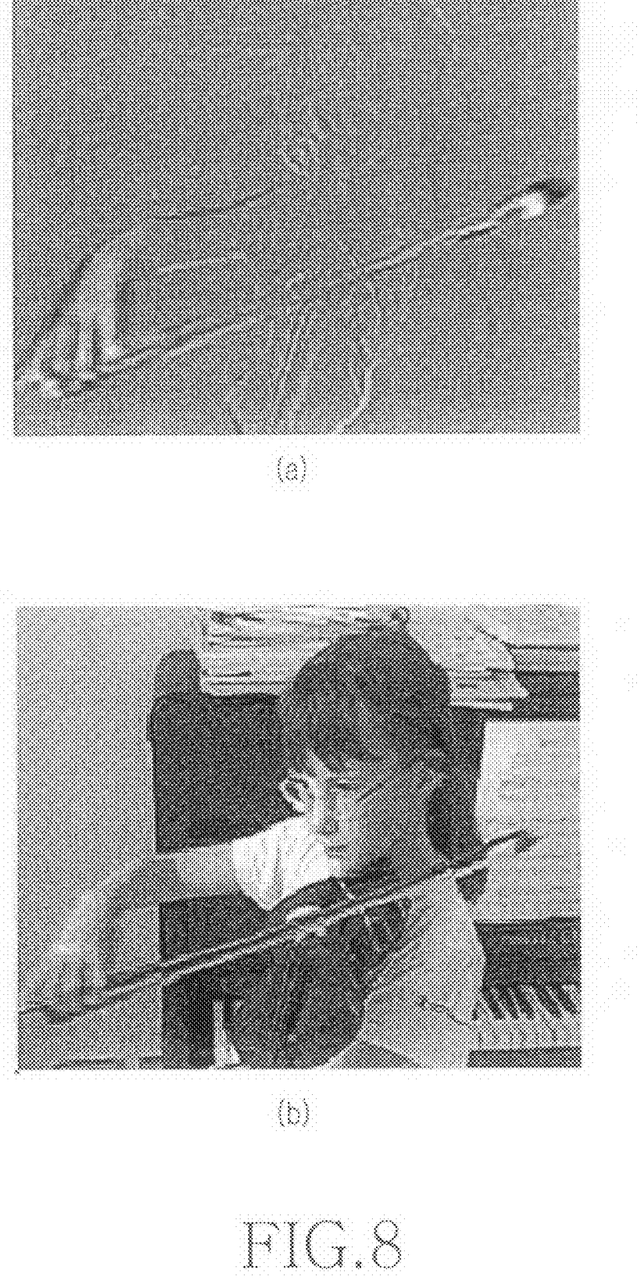

When the difference image is computed, the difference estimator 220 outputs the residual image corresponding to the difference L'-R between two images to the encoder 230. The right original image R is output from the first image input unit 200 to the encoder 230. Then, the encoder 230 encodes the right original image R and the difference L'-R between the two images in step 370. The global motion value is also encoded such that the receiving side can recover compressed images. Target images to be actually compressed in the encoder 230 are illustrated in FIG. 8. FIG. 8 illustrates examples of the target images to be compressed in accordance with an exemplary embodiment of the present invention. FIG. 8(a) illustrates the difference image, that is, the residual image, and FIG. 8(b) illustrates the right original image. As described above, the present invention can significantly improve compression efficiency by compressing only a difference image and one original image.

As is apparent from the above description, the present invention not only can minimize a computation amount, but also can reduce a transmission amount when compressed data is transmitted, by improving compression efficiency using a characteristic of similarity between left and right images of a stereo pair. As the compression efficiency is improved, the present invention can provide higher-quality images than an existing method, even when only a small data transmission amount is used.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus for compressing three-dimensional stereoscopic images, comprising:
    two image input units for outputting first and second images corresponding to images of one object;
    a difference estimator for searching for an overlapped image having the smallest disparity by comparing the first image with a search area in which a boundary part of the second image is extended, and for acquiring a residual image between the first image and the overlapped image whose position is arranged after computing and storing a position difference between the overlapped image and the second image; and
    an encoder for encoding the residual image and the position difference output from the difference estimator and the first image output from one of the image input units.

2. The apparatus of claim 1, wherein the difference estimator stores the position difference between the overlapped image and the second image as a vector value and acquires the residual image between the arranged overlapped image and the first image after position arrangement for a comparison between the overlapped image and the first image using global motion information corresponding to the vector value.

3. The apparatus of claim 2, wherein the residual image comprises a difference image acquired by subtracting the first image from the arranged overlapped image.

4. The apparatus of claim 1, wherein the search area is an area in which the boundary part of the second image is extended by a number of pixels, an area corresponding to the number of pixels being filled with pixels of the boundary part.

5. The apparatus of claim 1, wherein the two image input units are spaced from each other by a distance and further wherein the first and second images correspond to left and right images of the one object, respectively.

6. An apparatus for compressing three-dimensional stereoscopic images, comprising:
    a plurality of image input units for respectively outputting a plurality of images;
    a difference estimator for comparing a first of the plurality of images with a second of the plurality of images, for determining a position difference between the first image and the second image, and for acquiring a residual image corresponding to the first image and the second image; and
    an encoder for encoding the residual image, the position difference and the first image
    wherein the comparing of the first and second images comprises extending a boundary of the second image to create a search area and comparing the search area with the first image to determine an overlapped image having the smallest disparity.

7. The apparatus of claim 6, wherein the determining of the position difference comprises determining a position difference between the overlapped image and the second image.

8. The apparatus of claim 7, wherein the difference estimator stores the position difference between the overlapped image and the second image as a vector value and further wherein the acquiring of the residual image comprises comparing the overlapped image and the first image after positioning the overlapped image using global motion information corresponding to the vector value.

9. The apparatus of claim 8, wherein the residual image comprises a difference image acquired by subtracting the first image from the overlapped image.

10. The apparatus of claim 9, wherein the extending of the boundary of the second image to create the search area comprises extending the boundary of the second image by a number of pixels, an area corresponding to the number of pixels being filled with pixels of the boundary.

11. A method for compressing three-dimensional stereoscopic images in a mobile communication terminal, the method comprising:
    receiving first and second images of one object from two image input units;
    searching for an overlapped image having the smallest disparity by comparing the first image with a search area in which a boundary part of the second image is extended;
    acquiring a residual image between the first image and the overlapped image whose position is arranged after computing and storing a position difference between the overlapped image and the second image; and
    encoding the residual image, the position difference and the first image.

12. The method of claim 11, wherein the storing of the position difference between the overlapped image and the second image comprises storing the position difference as a vector value.

13. The method of claim 11, wherein the acquiring of the residual image between the arranged overlapped image and the first image comprises:
    performing position arrangement for a comparison between the overlapped image and the first image using the position difference; and
    acquiring a difference image by subtracting the first image from the arranged overlapped image.

14. The method of claim 12, wherein the search area is an area in which the boundary part of the second image is extended by a number of pixels, an area corresponding to the number of pixels being filled with pixels of the boundary part.

15. The method of claim 11, wherein the two image input units are spaced from each other by a distance and further wherein the first and second images correspond to left and right images of the one object, respectively.

16. A method for compressing three-dimensional stereoscopic images in a mobile communication terminal, the method comprising:
    receiving a plurality of images respectively from a plurality of image input units;
    comparing a first of the plurality of images with a second of the plurality of images;
    determining a position difference between the first image and the second image;
    acquiring a residual image corresponding to the first image and the second image; and
    encoding the residual image, the position difference and the first image,
    wherein the comparing of the first and second images comprises extending a boundary of the second image to create a search area and comparing the search area with the first image to determine an overlapped image having the smallest disparity.

17. The method of claim 16, wherein the determining of the position difference comprises determining a position difference between the overlapped image and the second image.

18. The method of claim 17, further comprising storing the position difference between the overlapped image and the second image as a vector value and further wherein the acquiring of the residual image comprises comparing the overlapped image and the first image after positioning the overlapped image using global motion information corresponding to the vector value.

19. The method of claim 18, wherein the acquiring of the residual image comprises subtracting the first image from the overlapped image.

20. The method of claim 19, wherein the extending of the boundary of the second image to create the search area comprises extending the boundary of the second image by a number of pixels and filling an area corresponding to the number of pixels with pixels of the boundary.

* * * * *